United States Patent [19]

Merritt

[11] Patent Number: 5,265,424
[45] Date of Patent: Nov. 30, 1993

[54] ADVANCED FURNACE BOILER SYSTEM IN ELECTRIC POWER PLANT

[76] Inventor: Thomas Merritt, 1957 NE. 149th St., Miami, Fla. 33181

[21] Appl. No.: 925,583

[22] Filed: Aug. 3, 1992

[51] Int. Cl.$^5$ .............................................. F01K 17/00
[52] U.S. Cl. .................................... 60/648; 60/670
[58] Field of Search ................ 60/648, 649, 670, 690, 60/692

[56] References Cited

U.S. PATENT DOCUMENTS

| | | | |
|---|---|---|---|
| 3,628,332 | 12/1971 | Kennar | 60/648 X |
| 4,099,382 | 7/1978 | Paull et al. | 60/648 |
| 4,382,366 | 5/1983 | Gaumer | 60/648 X |
| 4,910,963 | 3/1990 | Vanzo | 60/648 X |
| 5,040,370 | 8/1991 | Rathbone | 60/648 |

Primary Examiner—Stephen F. Husar

[57] ABSTRACT

A system for producing steam for the production of electricity includes a fossil fuel burning furnace in fluid communication with a liquid air fractional distillation facility. The liquid oxygen produced in the fractional distillation facility is used to increase the efficiency of the fractional distillation facility and the furnace. Gaseous nitrogen extracted from the fractional distillation facility is liquefied and used to increase efficiency of steam turbines by virtue of thermal communication with steam exiting the turbines. A magnetohydrodynamic electrical generation apparatus is included. Elements of the MHD apparatus are cooled cryogenically by liquid nitrogen, thereby enabling superconductivity to occur in the system. A suitable effluent gas recovery means is downstream of the furnace.

5 Claims, 2 Drawing Sheets

ADVANCED FURNACE BOILER SYSTEM IN ELECTRIC POWER PLANT

CROSS-REFERENCES TO RELATED APPLICATIONS

This invention uses the transmission of my issued U.S. Pat. Nos. 5,027,720 and 5,129,331.

BACKGROUND OF THE INVENTION

The present invention relates to fossil fuel burning furnaces, more particularly to a furnace which is utilized to boil water and heat steam for the production of electricity.

The present known means of achieving an optimum fuel oxygen mixture in these furnaces is to force large volumes of air over a fluidized or moving bed of coal or other fuel. The oxidation of these fuels in the presence of air produces flue gases that are classified as pollutants, such as nitrous oxides and other gases. These pollutants are known to contribute to the acid rain phenomenon and greenhouse effect, the primary cause of global warming. New technologies are being developed to control the emission of these gases. To date the known methods of emission control have proven to be costly and inefficient. Some methods use a chemical feedstock injected into furnace or effluent stream. Others have developed a procedure termed less excess air, and others have found benefit in producing a higher temperature flame. The best results known to date approach 90% reduction of $SO_2$ and/or $NO_x$. These technologies require more than 15% of the power generated at the facility, impairing rather than enhancing furnace efficiency. The novelty of this invention far exceeds its ability to limit nitrous oxide emissions. There is no known prior art in these areas which include the production and use of liquid nitrogen to cool steam, resulting in higher turbine efficiency and eliminating the need of cooling towers. The nitrogen is a by product of an air fractional distillation system which produces liquid oxygen used as a source for oxygen enrichment of the furnace.

The most pertinent prior art is U.S. Pat. No. 5,052,310 Goff et al. The proper areas of classification of the present invention are believed to be U.S. Pat. No. 110.

SUMMARY OF THE INVENTION

This invention relates to a coal-fired furnace boiler utilized in the production of electricity. In this furnace a highly enriched oxygen fire is produced in the combustion zone. This oxygen is fractionally distilled on the site of the power plant. As the liquid oxygen is changed to vapor before entering the furnace, its latent heat of vaporization is placed in thermal contact with the compressed air entering the fractional distillation system. This heat exchange eases the load on the machinery involved in the manufacture of liquid oxygen. The gaseous nitrogen contained in the fractional distillation system is withdrawn and liquified. The liquid nitrogen is then vaporized in another heat exchange means which is associated with the steam exiting the turbines. The evaporating nitrogen has a great cooling effect on the steam which causes greater pressure difference across the turbines than is achieved with cooling by water. This heat exchange means eliminates the need for costly and cumbersome water tower equipment. The liquid nitrogen may also be used for cryogenic cooling of elements in a magnetohydrodynamic electrical generator adapted to the flue gas exit of the furnace. The liquid nitrogen may also be stored as a chemical feedstock. Another use of the liquid nitrogen is to be employed with cryocoolers in the manufacture of dry ice from $CO_2$ captured in the vessels of a flue gas recovery means as shown in U.S. Pat. No. 5,027,720 and U.S. Pat. No. 5,129,331.

It is an object of the present invention to provide a super-efficient furnace in which the only flue gases are carbon dioxide and sulfur dioxide.

It is another object of the present invention to combine a facility for the liquefaction of air with a fossil fuel fired furnace utilized in the production of electricity.

It is another object of the present invention to provide cryogenic cooling means associated with the manufacture of dry ice and novel heat exchange means in the operation of steam turbines. The above and yet further objects and advantages of the present invention will become apparent from the hereinafter set forth in the Detailed Description of the Invention, the Drawings, and appended claims.

DETAILED DESCRIPTION OF THE INVENTION

Figure 1:
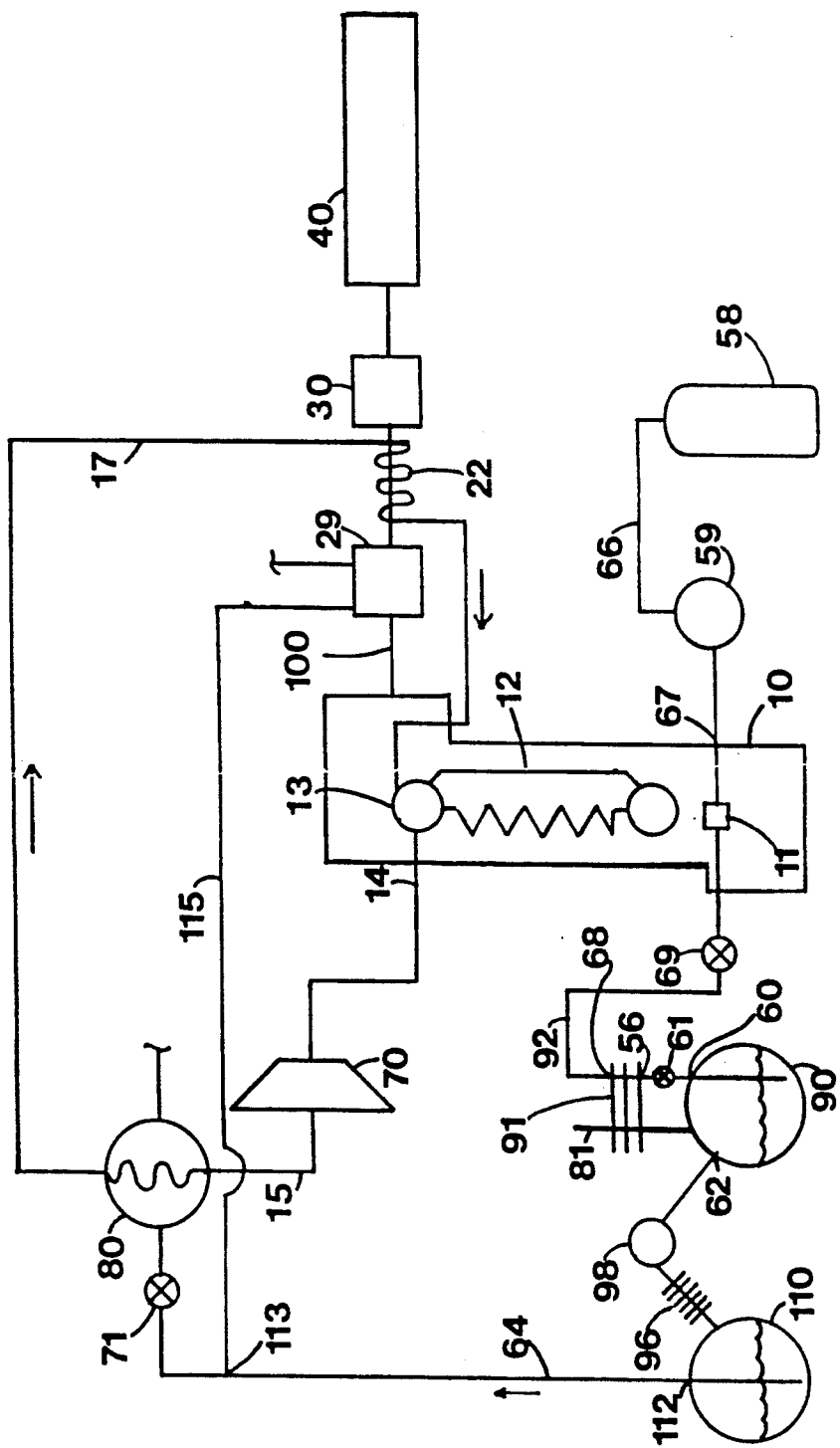
FIG. 1 is a schematic of the first embodiment of the instant invention.

With reference to FIG. 1 the present invention comprises apparatus and method for increasing the efficiency and decreasing the flue gas content of Furnace 10. The apparatus comprises an industrial style liquid air fractional distillation element 90 for separating gaseous nitrogen from liquid oxygen. This facility 90 has a fluid input 81 and a plurality of fluid outputs 60 and 62. Liquid oxygen exits the air liquification facility 90 through fluid output 60 through valve 61 and into fluid input means 56 of heat exchanger 91. The oxygen exits heat exchanger 91 by fluid output means 68 through conduit 92 which contains control valve 69 and continues to burner 11. Here the gaseous oxygen is mixed with fuel which is entering the burner through inlet 67. It should be noted that if coal is used as the fuel it will be pulverized at pulverizer 58, exiting pulverizer 58 through conduit 66. Heat created in the combustion zone causes feed water in boiler 12 to change to steam which is superheated in superheater 13. The high pressure steam exits superheater 13 through conduit 14 into steam turbine 70. Low pressure steam exiting turbine 70 exits through conduit 1 into heat exchanger 80 where it is condensed for return to boiler 12. The boiler water exiting heat exchanger 80 now returns through conduit 17 into economizer 22 and ultimately to boiler 12.

Figure 2:
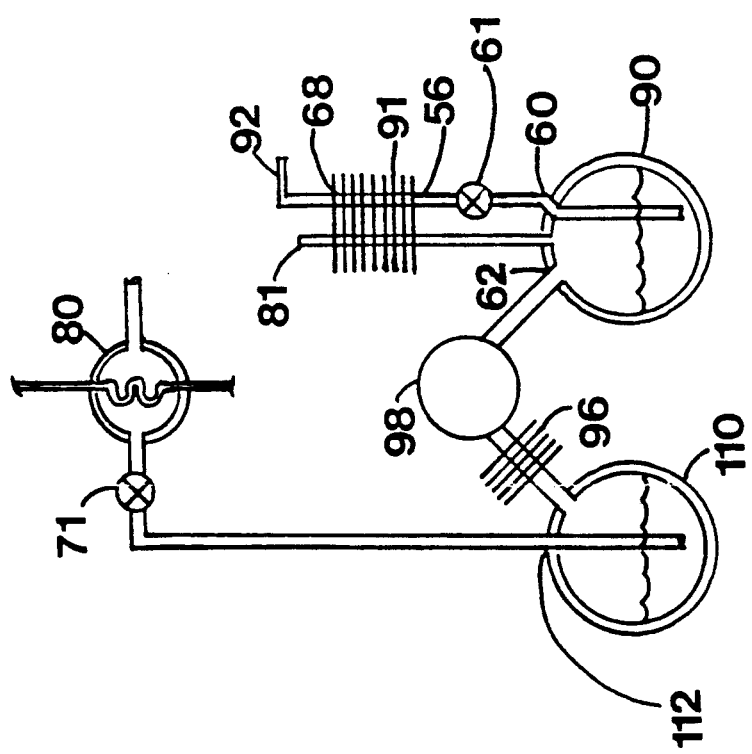
FIG. 2 is a schematic view of the liquid air fractional distillation apparatus including nitrogen cooling system.

In reference to FIGS. 1 and 2 gaseous nitrogen withdrawn from facility 90 by pump 98 is further cooled in condenser 96 and liquified in nitrogen liquification facility 110. The liquid nitrogen exits facility 110 through output 112 into conduit 64 through valve 71 and now enters heat exchange means 80 where it comes into thermal contact with steam exiting turbine 70. The liquid nitrogen changing to vapor causes rapid condensation and cooling of the water to return as feedwater to boiler 12. It should be appreciated that liquid nitrogen also can be routed from connection 113 through conduit 115 into MHD element 29 causing a superconducting effect in a magnetohydrodynamic electricity-generating system.

In the preferred embodiment flue gases exit furnace 10 through conduit 100 through MHD system 29 into electrostatic precipitator 30. The gases exiting precipitator 30 now enter into a suitable flue gas recovery system 40 such as that described in U.S. Pat. No. 5,127,720 and U.S. Pat. No. 5,129,331.

Having thus described my invention what I claim as new, useful and non-obvious and, accordingly secure by Letters, Patents of the United States is:

1. An advanced fossil fuel fired boiler system that produces steam to generate electricity which makes use of pure oxygen and liquid nitrogen to substantially enhance its performance, said furnace boiler system comprising:
   (a) a fossil fuel fired steam generating means with gaseous oxygen input and fuel input and effluent output;
   (b) said steam generation means providing steam to a turbine drive of an electric generator;
   (c) means for liquefying and fractionally distilling air, said means producing liquid oxygen and gaseous nitrogen;
   (d) a compressing and condensing means for the production of liquid nitrogen from said gaseous nitrogen, input of said compression and condensing means connected by fluid communication to a gaseous nitrogen output of said air liquefying and fractionally distilling means;
   (e) a storage vessel for said liquid nitrogen comprising fluid input and fluid output, said storage vessel input in fluid communication with fluid output of said nitrogen compressing and condensing means;
   (f) a heat exchanger comprising fluid input and output for said nitrogen and fluid input and output from steam exiting said turbine drive of electric generator, said input for nitrogen in fluid communication with fluid output of said nitrogen storage vessel, said heat exchange means between said liquid nitrogen and said steam exhaust of said turbine causing reduction in temperature of said stem exhaust;
   (g) a second heat exchanger for thermal communication between said liquid oxygen and air entering said means for liquefying and fractionally distilling air, said second heat exchanger for said liquid oxygen and said air causing efficiency in said means for liquefying and fractionally distilling air and evaporation of said liquid oxygen, said second heat exchange means connected to said fossil fuel fired steam generation means by fluid communication, said fluid communication providing a delivery path for gaseous oxygen to said fossil fuel fired steam generation means,
   (h) a means for capturing and converting the flue gases into byproducts there by enhancing the performance of said fossil fuel fired steam generating electric power plant.

2. The apparatus in claim 1 wherein electric generation is enhanced by magnetohydrodynamic power generation means using said flue gases of said fossil fuel fired steam generation means.

3. The apparatus in claim 2 further comprising fluid communication between said liquid nitrogen storage vessel and said magnetohydrodynamic power generation means, said fluid communication comprising heat exchange means between said magnetohydrodynamic power generation means and said liquid nitrogen.

4. The apparatus in claim 1 further comprising electrostatic precipitation means for the purpose of removing nongaseous components of the effluent of said fossil fuel fired steam generation means.

5. A method of generating electricity from fossil fuels, said method making use of pure oxygen and liquid nitrogen to substantially enhance performance compared to conventional fossil fueled turbine electric generating systems, said method comprising:
   a) liquefying and distilling air to produce liquid oxygen and gaseous nitrogen;
   b) liquefying said gaseous nitrogen;
   c) storing said liquid nitrogen;
   d) evaporating said stored liquid oxygen to form gaseous oxygen improving the efficiency of said gas liquefaction by heat exchange with said air;
   e) combustion of fossil fuel in a furnace in the presence of said gaseous oxygen;
   f) boiling water to steam using heat from said combustion;
   g) propelling a turbine electric generator with said steam;
   h) reducing temperature and pressure of steam exhaust from said turbine electric generator by heat exchange with said liquid nitrogen.

* * * * *